United States Patent
Wilson et al.

(10) Patent No.: US 12,452,252 B2
(45) Date of Patent: Oct. 21, 2025

(54) SELF-OPTIMIZING DEPLOYMENT OF DECOUPLED THREAT MANAGEMENT APPLICATIONS WITHIN CLOUD ENVIRONMENTS

(71) Applicant: Sophos Limited, Abingdon (GB)

(72) Inventors: James Gordon Wilson, Oxfordshire (GB); Guy William Roberts, Milton Keynes (GB); Simon Neil Reed, Wokingham (GB); Marc Ashley McGinnis, Tampa, FL (US)

(73) Assignee: Sophos Limited, Abingdon (GB)

( * ) Notice: Subject to any disclaimer, the term of this patent is extended or adjusted under 35 U.S.C. 154(b) by 13 days.

(21) Appl. No.: 18/420,924

(22) Filed: Jan. 24, 2024

(65) Prior Publication Data

US 2025/0233864 A1   Jul. 17, 2025

Related U.S. Application Data

(63) Continuation of application No. 18/411,625, filed on Jan. 12, 2024.

(51) Int. Cl.
*H04L 9/40* (2022.01)
*G06F 11/34* (2006.01)

(52) U.S. Cl.
CPC ........ *H04L 63/107* (2013.01); *G06F 11/3409* (2013.01); *H04L 63/1425* (2013.01); *G06F 2212/1016* (2013.01)

(58) Field of Classification Search
CPC ............... H04L 63/107; H04L 63/1425; G06F 11/3409; G06F 2212/1016
See application file for complete search history.

(56) References Cited

U.S. PATENT DOCUMENTS

| | | | |
|---|---|---|---|
| 8,239,526 B2 * | 8/2012 | Simpson ................. | H04L 43/08 709/224 |
| 2018/0267833 A1 | 9/2018 | Chen et al. | |
| 2022/0255801 A1 | 8/2022 | Singh et al. | |
| 2025/0039130 A1 * | 1/2025 | Mestery ................. | H04L 45/08 |

OTHER PUBLICATIONS

UKIPO, , "Application No. GB2500340.1 Combined Search and Exam Report mailed Jul. 3, 2025", NPL-1223 , 6 pages.

\* cited by examiner

*Primary Examiner* — Huan V Doan
(74) *Attorney, Agent, or Firm* — Strategic Patents, P.C.

(57) ABSTRACT

A threat management application is decoupled into a backend tier deployed at a regional compute resource of a cloud environment and a frontend tier deployed at one or more local compute resources of the cloud environment. A threat lookup request is routed from an endpoint to a frontend tier deployed at a respective local compute resource. The frontend tier determines if a local threat response is available within a cache of the respective local compute resource. If the local threat response is available, the local threat response is provided to the endpoint. If the local threat response is not available, the threat lookup request is forwarded from the respective local compute resource to the backend tier deployed at the regional compute resource.

20 Claims, 9 Drawing Sheets

SELF-OPTIMIZING DEPLOYMENT OF DECOUPLED THREAT MANAGEMENT APPLICATIONS WITHIN CLOUD ENVIRONMENTS

CROSS-REFERENCE TO RELATED APPLICATIONS

This application is a continuation of U.S. patent application Ser. No. 18/411,625 filed on Jan. 12, 2024, the entire content of which is hereby incorporated by reference herein.

FIELD OF INVENTION

The present disclosure relates to cloud based threat management applications. Particularly, but not exclusively, the present disclosure relates to decoupled threat management applications within a cloud environment; more particularly, but not exclusively, the present disclosure relates to optimized deployment of decoupled threat management applications within a cloud environment.

BACKGROUND

Threat management applications seek to determine a suitable threat response to a threat lookup request. For example, a threat management application may determine whether an endpoint should be allowed to access a resource associated with a Uniform Resource Locator, URL. Cloud computing environments allow threat management applications to be served to a large number of endpoints covering wide geographic areas.

As such, there is a need for efficient and improved methods of deploying threat management applications within cloud environments.

SUMMARY

In accordance with an aspect of the present disclosure there is provided a system for deployment of decoupled threat management applications. The system is configured to deploy, at a regional compute resource of a cloud environment, a backend tier of a threat management application, wherein the regional compute resource is located within a geographic region having one or more geographic zones. The system is further configured to deploy, at one or more local compute resources of the cloud environment, a frontend tier of the threat management application, wherein the one or more local compute resources are located within the one or more geographic zones of the geographic region, each of the one or more local compute resources comprising a respective first cache. The frontend tier of the threat management application, when executed by a respective local compute resource, causes the respective local compute resource to receive, from an endpoint, a threat lookup request in relation to an object associated with the endpoint, wherein the threat lookup request is routed from the endpoint to the respective local compute resource based at least in part on a latency between the endpoint and the respective local compute resource, determine if a local threat response to the threat lookup request is available within the first cache of the respective local compute resource, if the local threat response is available within the first cache, cause the local threat response to be provided to the endpoint as a response to the threat lookup request, and if the local threat response is not available within the first cache, forward the threat lookup request to the regional compute resource.

According to a further aspect of the present disclosure there is provided a method for deployment of decoupled threat management applications. The method comprises identifying a regional compute resource of a cloud environment, the regional compute resource having a backend tier of a threat management application deployed thereon, wherein the regional compute resource is located within a geographic region, identifying one or more local compute resources of the cloud environment each having a frontend tier of the threat management application deployed thereon, wherein the one or more local compute resources are located within one or more geographic zones of the geographic region, each of the one or more local compute resources comprising a first cache, receiving, at a respective local compute resource and from an endpoint, a threat lookup request in relation to an object associated with the endpoint, wherein the threat lookup request is routed from the endpoint to the respective local compute resource based on a latency between the endpoint and the respective local compute resource, determining, at the respective local compute resource, if a local threat response to the threat lookup request is available within the first cache of the respective local compute resource, if the local threat response is available within the first cache, causing, at the respective local compute resource, the local threat response to be provided to the endpoint as a response to the threat lookup request, and if the local threat response is not available within the first cache, forwarding, from the respective local compute resource, the threat lookup request to the regional compute resource.

According to an additional aspect of the present disclosure there is provided a non-transitory computer readable medium storing instructions which, when executed by one or more processors of a device, cause the device to carry out the steps of identifying a regional compute resource of a cloud environment, the regional compute resource having a backend tier of a threat management application, wherein the regional compute resource is located within a geographic region, identifying one or more local compute resources of the cloud environment each having a frontend tier of the threat management application deployed thereon, wherein the one or more local compute resources are located within one or more geographic zones of the geographic region, each of the one or more local compute resources comprising a first cache, receiving, at a respective local compute resource and from an endpoint, a threat lookup request in relation to an object associated with the endpoint, wherein the threat lookup request is routed from the endpoint to the respective local compute resource based on a latency between the endpoint and the respective local compute resource, determining, at the respective local compute resource, if a local threat response to the threat lookup request is available within the first cache of the respective local compute resource, if the local threat response is available within the first cache, causing, at the respective local compute resource, the local threat response to be provided to the endpoint as a response to the threat lookup request, and if the local threat response is not available within the first cache, forwarding, from the respective local compute resource, the threat lookup request to the regional compute resource.

According to a further aspect of the present disclosure there is provided a method for optimizing deployment of services within a cloud environment comprising local compute resources. The method comprises analyzing the cloud environment by identifying a currently active subset of local compute resources within the cloud environment, each of the currently active subset of local compute resources having a service deployed thereon, collecting operational data related to the currently active subset of local compute resources and one or more other local compute resources within the cloud environment, determining a performance metric for each local compute resource based on the operational data, and identifying a target subset of local compute resources based on the performance metric, wherein the performance metric associated with each of the target subset of local compute resources satisfies a predetermined criterion. The method further comprises adjusting deployment of the service such that the service is deployed on each of the target subset of local compute resources.

According to another aspect of the present disclosure there is provided a non-transitory computer readable medium storing instructions which, when executed by one or more processors of a device, cause the device to carry out the steps of identifying a current subset of local compute resources within a cloud environment, each of the current subset of local compute resources having a service deployed thereon, collecting operational data related to the current subset of local compute resources and one or more other local compute resources within the cloud environment, determining a performance metric for each local compute resource based on the operational data, identifying a target subset of local compute resources based on the performance metric, wherein the performance metric associated with each of the target subset of local compute resources satisfies a predetermined criterion, and adjusting deployment of the service such that the service is subsequently only deployed on the target subset of local compute resources.

According to an additional aspect of the present disclosure there is provided a device comprising one or more processors and a memory storing instructions which, when executed by the one or more processors, cause the device to carry out the steps of identifying a first subset of local compute resources within the cloud environment, each of the first subset of local compute resources having a service deployed thereon, collecting operational data related to the first subset of local compute resources and one or more other local compute resources within the cloud environment, determining a performance metric for each local compute resource based on the operational data, identifying a second subset of local compute resources based on the performance metric, wherein the performance metric associated with each of the second subset of local compute resources satisfies a predetermined criterion, and adjusting deployment of the service such that the service is deployed on the second subset of local compute resources and not on the first subset of local compute resources.

According to a further aspect of the present disclosure there is provided a system for deployment of decoupled threat management applications within a cloud environment comprising local compute resources. The system comprising an interface communicatively coupled to a regional compute resource of a cloud environment, the regional compute resource comprising a backend tier of a threat management application, wherein the regional compute resource is located within a geographic region having a plurality of geographic zone, and a plurality of local compute resources of the cloud environment, each of the plurality of local compute resources comprising a frontend tier of the threat management application and a respective first cache, wherein the plurality of local compute resources are located within the plurality of geographic zones of the geographic region. The system further comprises one or more processors configured to identify a first subset of the plurality of local compute resources within the cloud environment, collect operational data related to the plurality of local compute resources within the cloud environment, determine a performance metric for each of the plurality of local compute resources based on the operational data, identify a second subset of the plurality of local compute resources based on the performance metric, wherein the performance metric associated with each of the second subset of the plurality of local compute resources satisfies a predetermined criterion, and adjust deployment of the frontend tier of the threat management application such that the frontend tier of the threat management application is deployed on each of the second subset of the plurality of local compute resources. The frontend tier of the threat management application, when executed by a respective local compute resource of the plurality of local compute resources, causes the respective local compute resource to receive, from an endpoint, a threat lookup request in relation to an object associated with the endpoint, wherein the threat lookup request is routed from the endpoint to the respective local compute resource based at least in part on a latency between the endpoint and the respective local compute resource, determine if a local threat response to the threat lookup request is available within the first cache of the respective local compute resource, if the local threat response is available within the first cache, cause the local threat response to be provided to the endpoint as a response to the threat lookup request, and if the local threat response is not available within the first cache, forward the threat lookup request to the regional compute resource.

Further aspects and embodiments of the present disclosure are set out in the appended claims.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
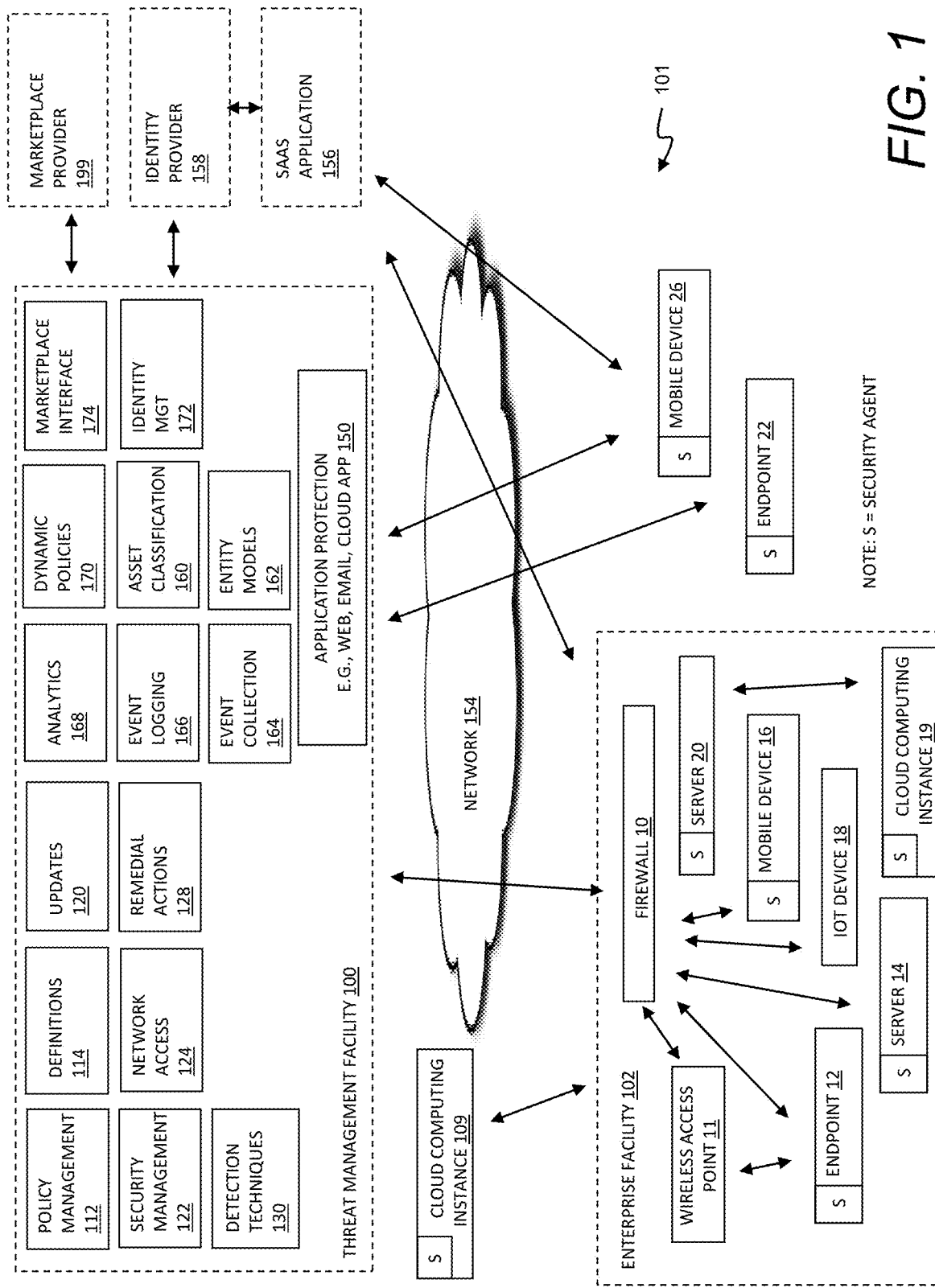
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IoT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware.

Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that is accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be the identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
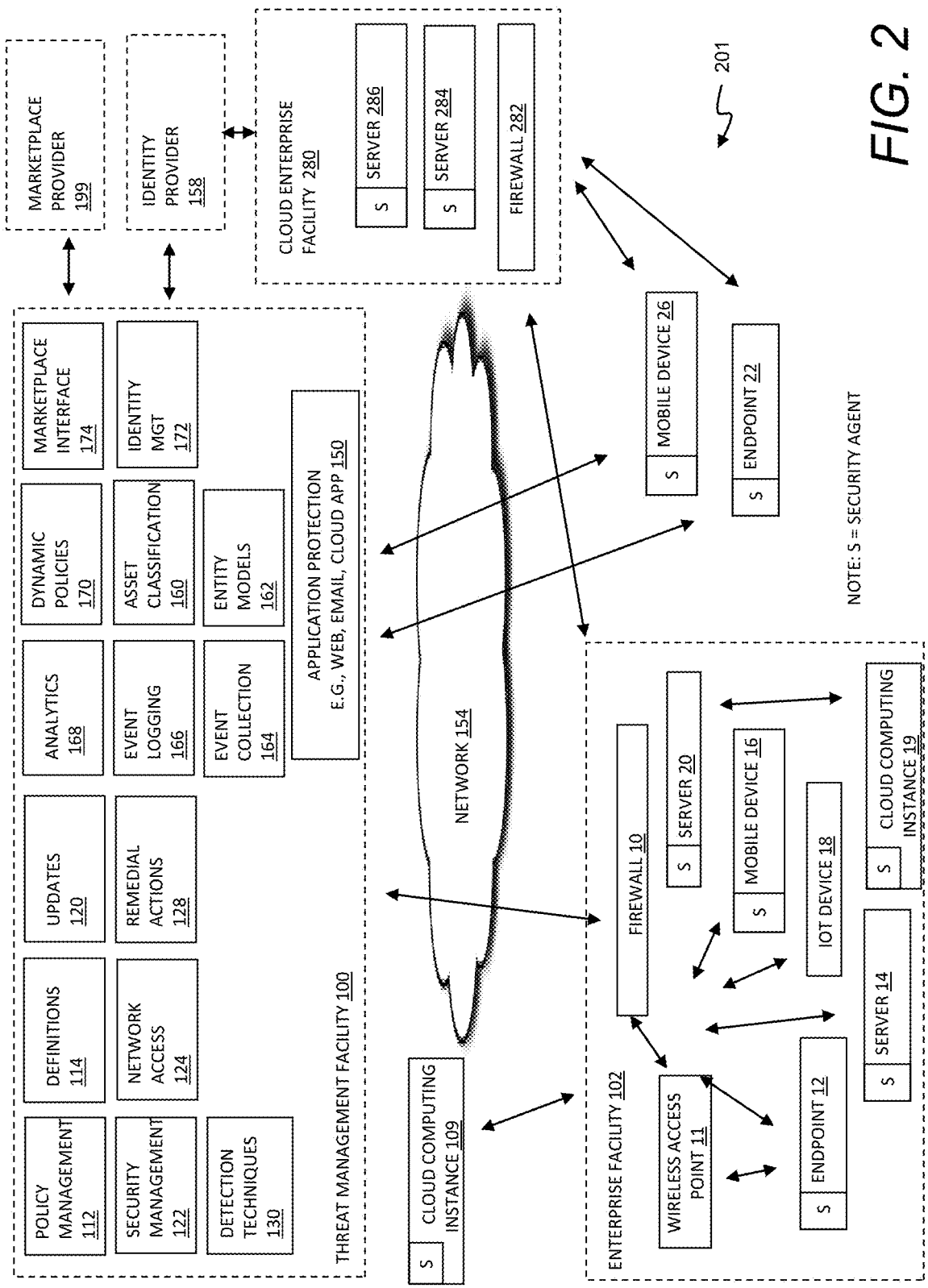
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
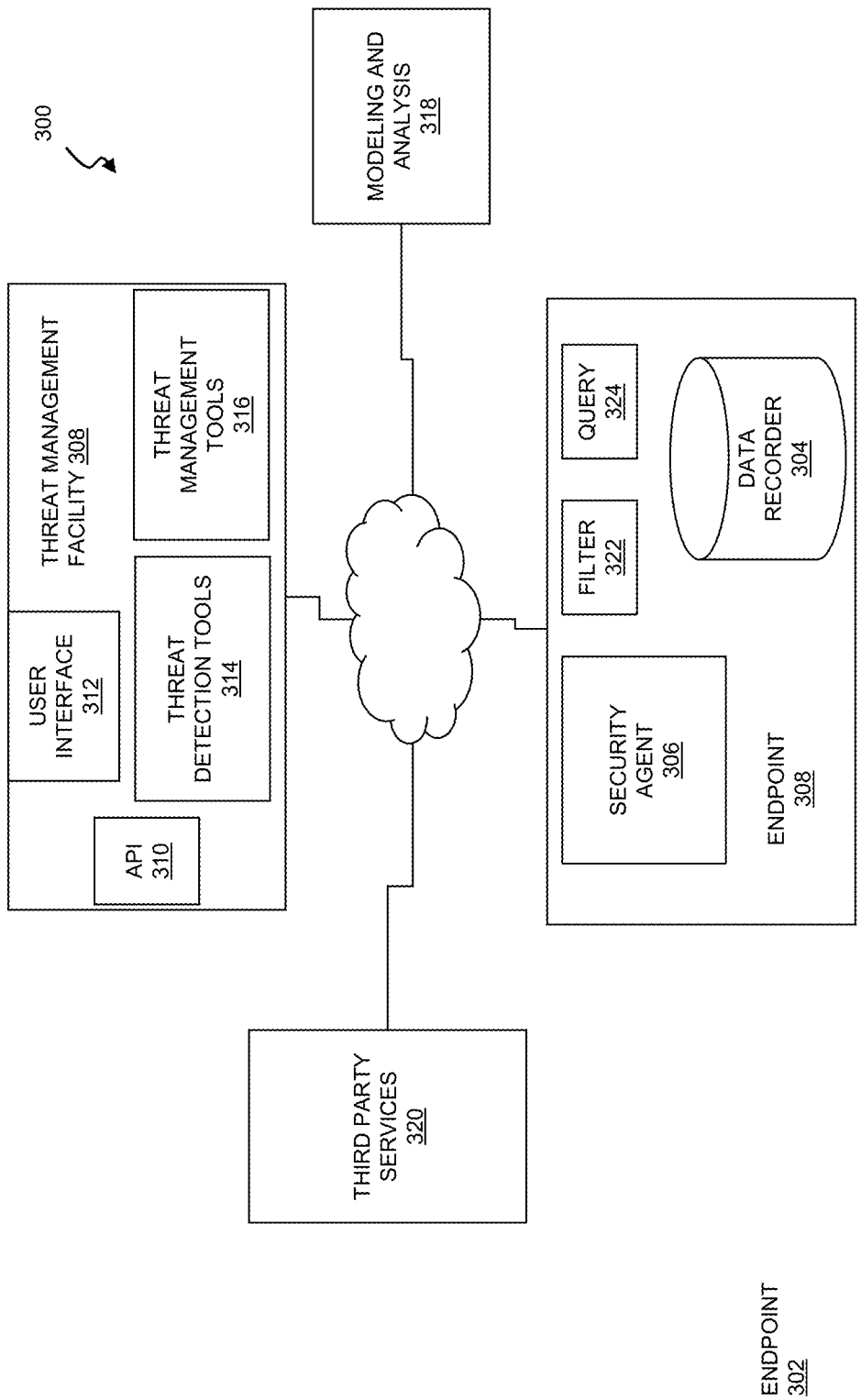
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
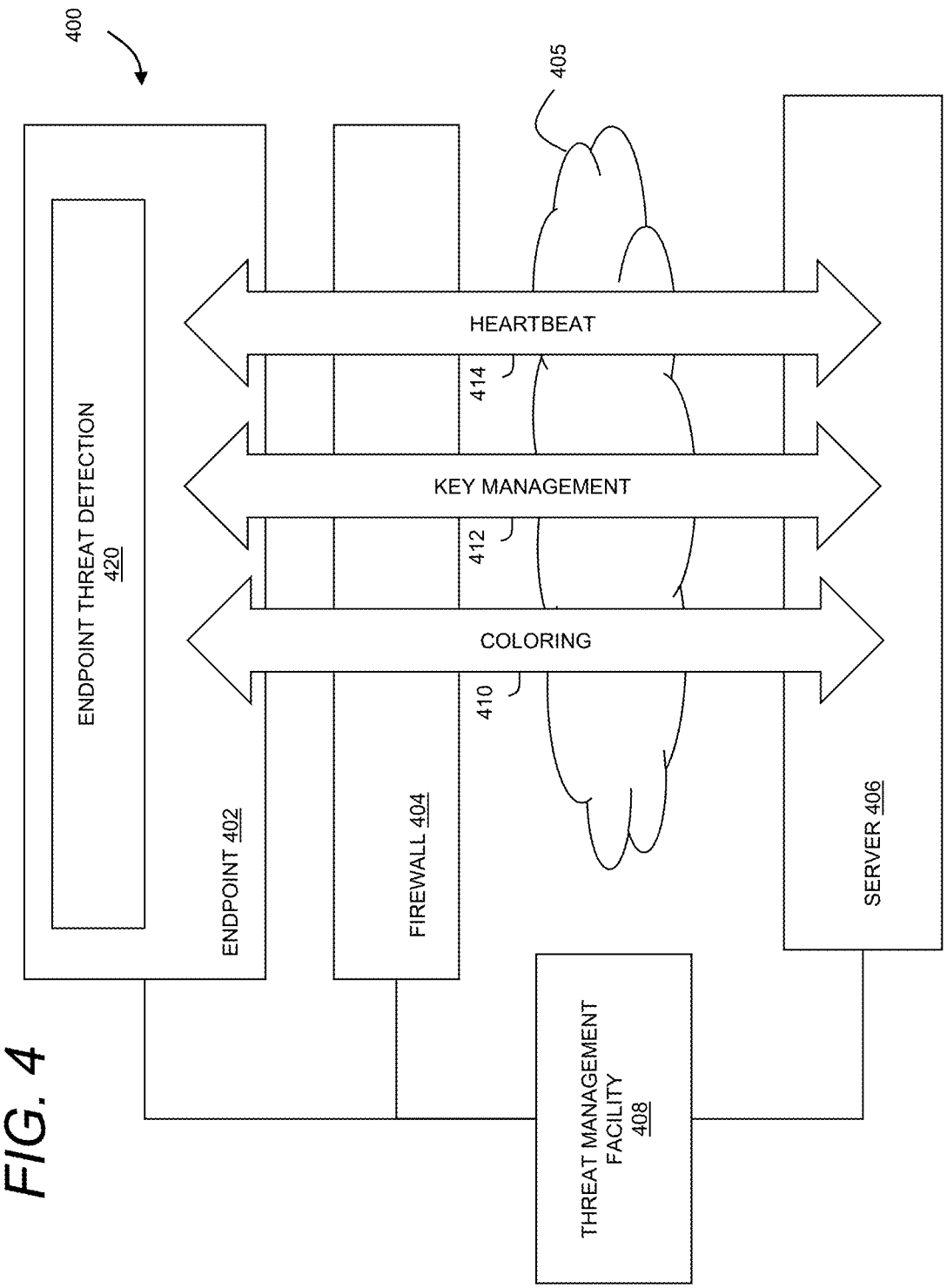
FIG. 4 illustrates a threat management system.

FIG. 4 illustrates a threat management system. In general, the system 400, which may be any of the enterprise networks and/or other networks or systems described herein, may include an endpoint 402, a firewall 404, a server 406 and a threat management facility 408 coupled to one another directly or indirectly through a data network 405, all as generally described above with reference to FIGS. 1-3. Each of the entities depicted in FIG. 4 may, for example, be implemented on one or more computing devices such as the computing devices described herein. A number of systems and subsystems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

The present disclosure relates to cloud environments and cloud environments for use with threat management applications. Aspects of the present disclosure seek to optimize the deployment of security services within cloud environments so that a more reliable, efficient, and robust security service can be provided to an endpoint (e.g., within an enterprise network).

Figure 5A:
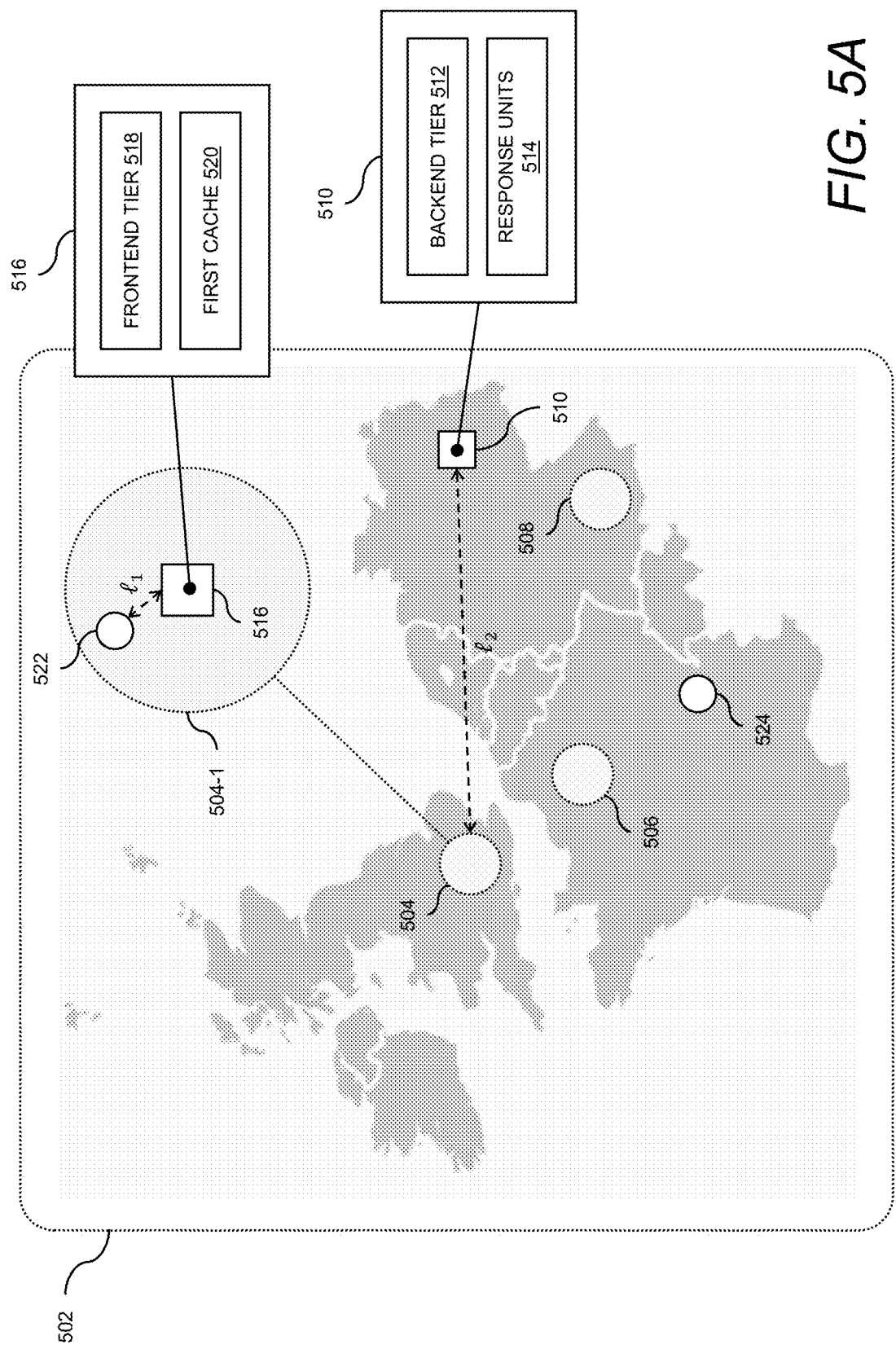
FIG. 5A illustrates decoupled threat management applications deployed within a cloud environment.

FIG. 5A illustrates a decoupled threat management application deployed within a cloud environment according to an aspect of the present disclosure. FIG. 5A shows a geographic region 502 of a cloud computing environment. The geographic region 502 includes a first geographic zone 504, a second geographic zone 506, and a third geographic zone 508. A regional compute resource 510 is located within the geographic region 502 and serves endpoints within the geographic region 502. The regional compute resource 510 has a backend tier 512 of a threat management application deployed thereon and further includes a plurality of response units 514. FIG. 5A further shows an expanded view 504-1 of the first geographic zone 504. As shown within the expanded view 504-1, a first local compute resource 516 is located within the first geographic zone 504 and serves endpoints within the first geographic zone 504. The first local compute resource has a frontend tier 518 of the threat management application deployed thereon and further includes a first cache 520. FIG. 5A also shows a first endpoint 522 within the first geographic zone 504 and a second endpoint 524 located within the geographic region 502. Although FIG. 5A only shows the expanded view 504-1 of the first geographic zone 504, the skilled person will appreciate that the other geographic zones within the geographic region 502 (e.g., the second geographic zone 506 and the third geographic zone 508) also have a respective local compute resource having a frontend tier of the threat management application deployed thereon and a respective first cache. By way of illustration, the geographic region 502 in FIG. 5A represents North-Western Europe with the regional compute resource being located within Berlin. The first geographic zone 504 corresponds to the London metropolitan area such that the first local compute resource 516 is located within the London metropolitan area. The second geographic zone 506 and the third geographic zone correspond to the Paris and Munich metropolitan areas respectively.

In general, a threat management application deployed within a cloud environment such as that illustrated in FIG. 5A is configured to analyze a threat lookup request received from an endpoint (e.g., the first endpoint 522 or the second endpoint 524) and determine an appropriate threat response to be provided to the endpoint. For example, a threat lookup request may correspond to a request received from an endpoint to access a resource association with a URL, and the threat management application will return a threat response allowing or denying the endpoint access to the URL based on whether the URL is trusted. According to the present disclosure, the threat management application is decoupled into one or more frontend tiers and a backend tier. Each frontend tier is deployed on a local compute resource within a geographic zone (e.g., the frontend tier 518 deployed on the first local compute resource 516 within the first geographic zone 504) thereby serving a potentially large number of endpoints which are within, or proximate to, the geographic zone. Each local compute resource includes a cache populated with threat lookup requests and corresponding threat responses such that a frontend tier may determine if a threat response to a threat lookup request received from an endpoint is locally available within the cache and, if available, quickly and efficiently return the threat response to the endpoint. If a threat response is not locally available, the threat lookup request is forwarded to a regional compute resource (e.g., the regional compute resource 510) which queries a larger number of sources to determine the threat response (e.g., the backend tier 512 queries the plurality of response units 514). The threat lookup request and corresponding threat response may then be added to the cache of the local compute resource. Because most threat lookup requests are cyclical and repetitious, storing such common threat lookup requests and corresponding threat responses within high speed caches at local compute resources (e.g., an L1 cache) helps to reduce the lookup and response time. In practice, a cache of a local compute resource holds threat responses to around 80% of threat lookup requests. As a result, the latency $\ell_1$ associated with the first endpoint 522 receiving a threat lookup response from the first local compute resource 516 is significantly less than the latency $\ell_2$ associated with the first endpoint 522 receiving a threat lookup response from the regional compute resource 510 (i.e., $\ell_1 \ll \ell_2$).

Although FIG. 5A only shows three geographic zones, a geographic region typically comprises far more geographic zones (e.g., 10, 20, 100, etc.). It may be inefficient to deploy the frontend tier on all local compute resources within all geographic zones since some local compute resources may be redundant, underutilized, or poor performing. According to the present disclosure, an optimal deployment of the frontend tier (i.e., service) within the cloud environment is discovered and iteratively adapted over time to help account for changes in the topology and/or performance of the cloud environment.

Figure 5B:
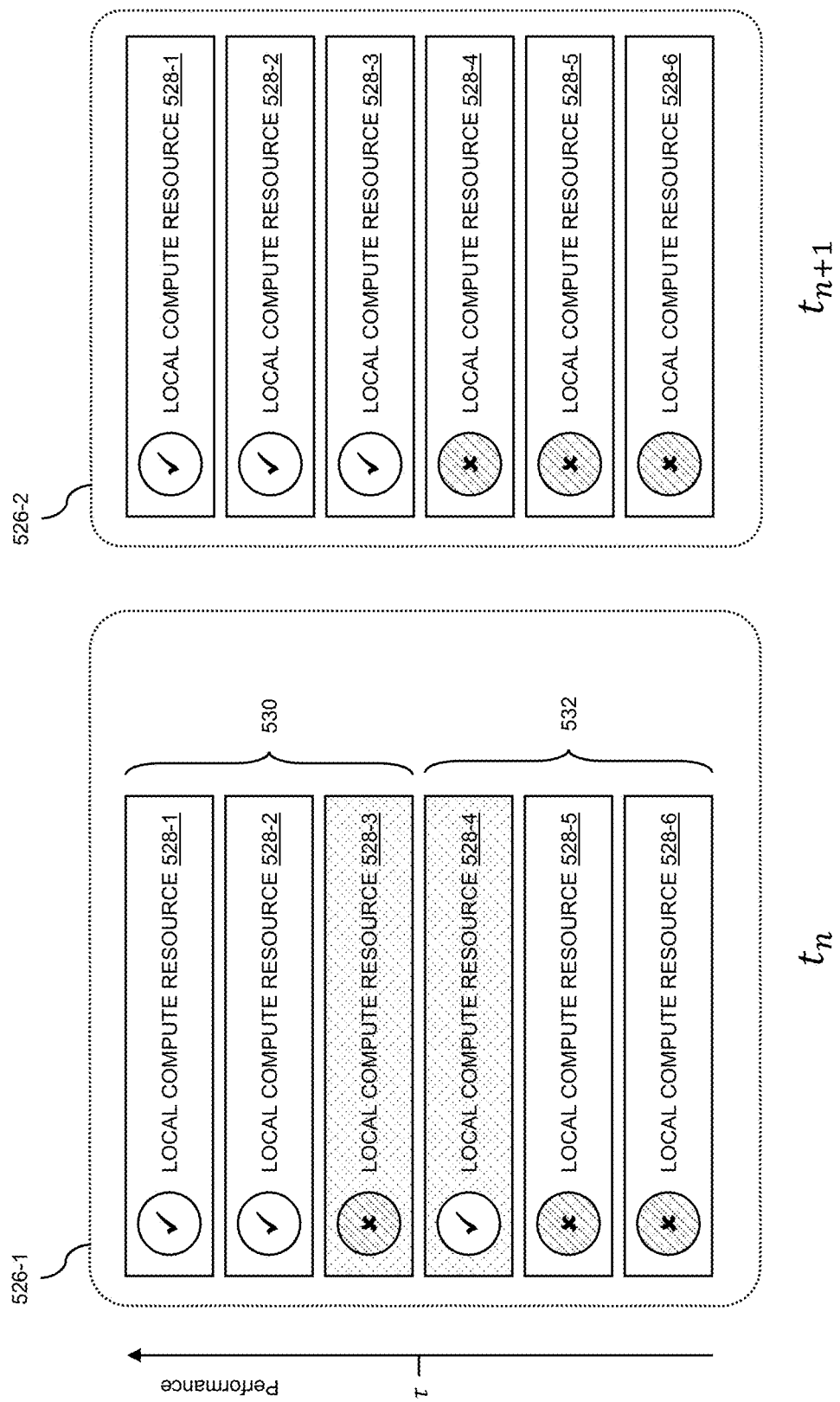
FIG. 5B illustrates optimization of service deployment within a cloud environment.

FIG. 5B illustrates optimization of service deployment within a cloud environment according to an aspect of the present disclosure. FIG. 5B shows a first state 526-1 of a plurality of local compute resources within the cloud environment of FIG. 5A at time point $t_n$ and a second state 526-2 of the plurality of local compute resources at time point $t_{n+1}$. The plurality of local compute resources comprise a first local compute resource 528-1, a second local compute resource 528-2, a third local compute resource 528-3, a fourth local compute resource 528-4, a fifth local compute resource 528-5, and a sixth local compute resource 528-6. At time point $t_n$, a first subset 530 of the plurality of local compute resources and a second subset 532 of the plurality of local compute resources are formed. The first subset 530 comprises the first local compute resource 528-1, the second local compute resource 528-2, and the third local compute resource 528-3. The second subset 532 comprises the fourth local compute resource 528-4, the fifth local compute resource 528-5, and the sixth local compute resource 528-6. The first local compute resource 542-1, the second local compute resource 542-2, and the fourth local compute resource 542-4 each have a service deployed thereon (e.g., the frontend tier of the threat management application) such that these local compute resources form an active subset of the plurality of local compute resources. These local compute resources are considered "active" because the service is actively running or executing on each of the local compute resources (e.g., the frontend tier is deployed and actively serving threat lookup requests). The first local compute resource 528-1, the second local compute resource 528-2, and the fourth local compute resource 528-4 shown in FIG. 5B thus correspond to the first local compute resource 516 of the first geographic zone 504, the second local compute resource (not shown) of the second geographic zone 506, and the third local compute resource (not shown) of the third geographic zone 508 in FIG. 5A. The third local compute resource 528-3, the fifth local compute resource 528-5, and the sixth local compute resource 528-6 shown in FIG. 5B correspond to local compute resources of other geographic zones not shown within the geographic region 502 in FIG. 5A.

The plurality of local compute resources at time points to and $t_n$ and $t_{n+1}$ are shown ranked according to a performance metric such that the first local compute resource 542-1 corresponds to the highest performing local compute resource according to the performance metric whilst the sixth local compute resource 542-6 corresponds to the lowest performing local compute resource according to the performance metric. Here, the performance metric may correspond to current or predicted metrics such as computational cost, query volume, energy usage, financial cost, and the like. For example, the first local compute resource 542-1 may be associated with a low computational cost metric whilst the sixth local compute resource 542-6 may be associated with a high computational cost metric. Based on the performance metrics associated with each local compute resource and a predetermined criterion, a target subset of local compute resources may be identified. The target subset corresponds to the group of local compute resources upon which the service (e.g., the frontend tier of the threat management application) should be deployed since the target subset comprises the highest performing local compute resources. In FIG. 5B, the first subset 530 corresponds to the target subset of local compute resources because the first local compute resource 528-1, the second local compute resource 528-2, and the third local compute resource 528-3 each have a corresponding performance metric which satisfies a predetermined criterion—in this example, each have a performance metric which exceeds a threshold performance value, $\tau$.

Therefore, the deployment of the service within the cloud environment can be optimized by deploying the service on the target subset of the plurality of local compute resources (i.e., the first subset 530). That is, the service can be provisioned on the third local compute resource 528-3 (e.g., by spinning up the third local compute resource 528-3 and subsequently deployed the service thereon) whilst de-provisioning the service on the fourth local compute resource 528-4 (because the fourth local compute resource 528-4 is a part of the active subset but does not form a part of the target subset). The second state 526-2 of the plurality of local compute resources shows the result of performing the previously described optimization. At time point $t_{n+1}$, the first local compute resource 528-1, the second local compute resource 528-2, and the third local compute resource 528-3 form the active subset such that the service (e.g., the frontend tier of the threat management application) is only deployed on the highest performing local compute resources.

According to the present disclosure, the above optimization approach is repeatedly performed to adjust deployment of a service within a cloud environment in order to perform an iterative service deployment optimization. As such, deployment of the service is adjusted to account for dynamic or predicted changes in the topology and/or performance of the cloud environment over time.

Figure 6:
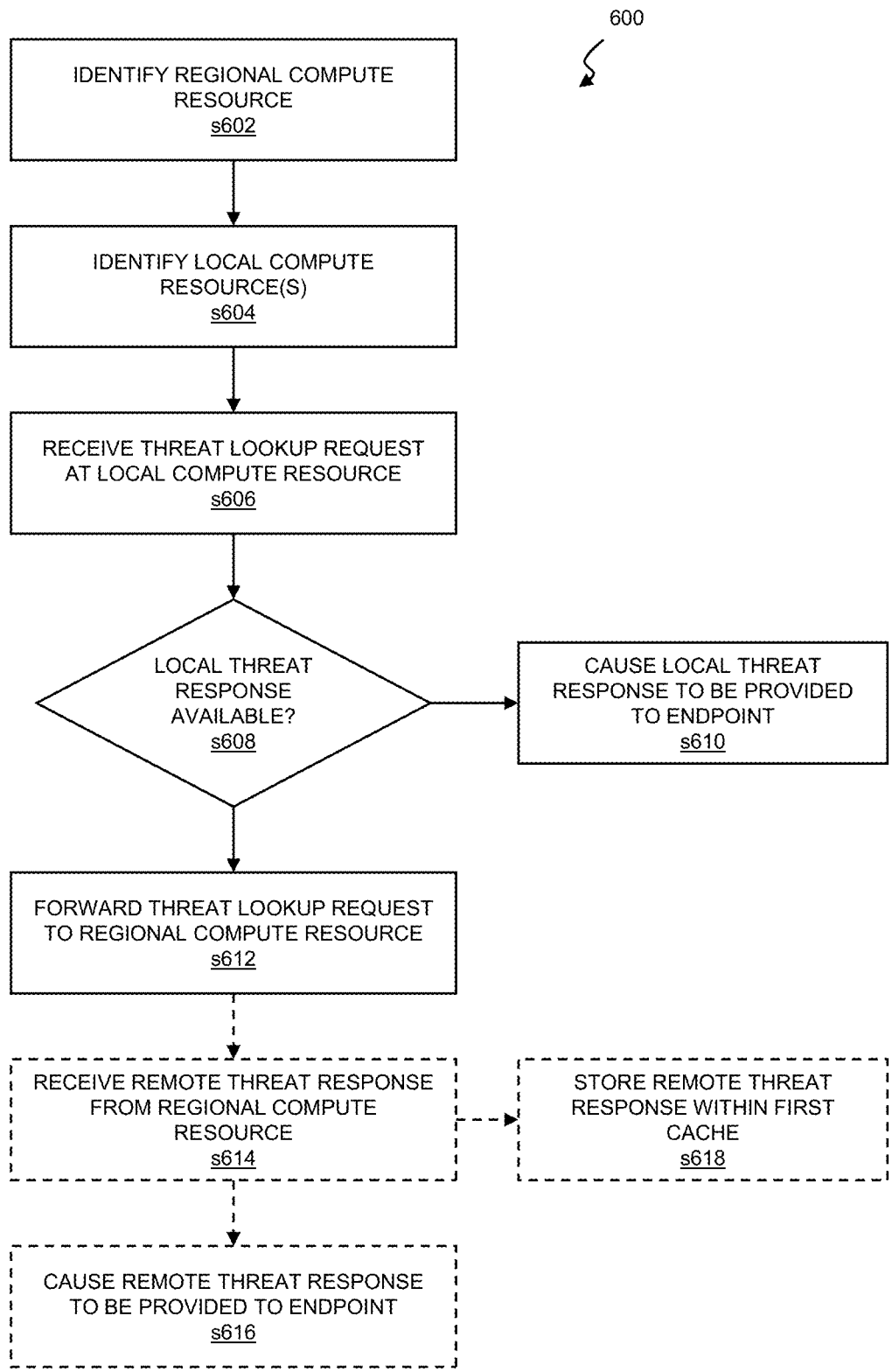
FIG. 6 illustrates a flow diagram of a method for deployment of decoupled threat management applications.

FIG. 6 illustrates a flow diagram of a method 600 for deployment of decoupled threat management applications according to an aspect of the present disclosure.

At s602, a regional compute resource of a cloud environment is identified. The regional compute resource has a backend tier of a threat management application deployed thereon. The regional compute resource is located within a geographic region. For example, as shown in FIG. 5A, the regional compute resource 510 is located within the geographic region 502 and has the backend tier 512 of the threat management application deployed thereon.

At s604, one or more local compute resources of the cloud environment are identified. Each of the one or more local compute resources have a frontend tier of the threat management application deployed thereon. The one or more local compute resources are located within one or more geographic zones of the geographic region. Each of the one or more local compute resources comprise a first cache. In the example shown in FIG. 5A, the first local compute resource 516 is located within the first geographic zone 504 of the geographic region 502 and comprises the first cache 520.

At s606, a respective local compute resource of the one or more local compute resources receives, from an endpoint, a threat lookup request in relation to an object associated with the endpoint. The threat lookup request is routed from the endpoint to the respective local compute resource based on a latency between the endpoint and the respective local compute resource. For example, a threat lookup request from the first endpoint 522 is routed to the first local compute resource 516 of the first geographic zone 504 as opposed to a local compute resource associated with the second geographic zone 506 or the third geographic zone 508 because the latency between the first endpoint 522 and the first local compute resource 516 is lower than the latency between any other local compute resource. In some instances, a threat lookup request is routed to the geographically closest compute resource since this compute resource provides the lowest latency. However, in some instances, the closest (in a geographic sense) compute resource does not provide the lowest latency option such that the threat lookup request is routed to a geographically more distant compute resource which provides a lower latency.

In general, the object associated with the endpoint corresponds to an object which a user at the endpoint, or a process executing at the endpoint, has requested to access. In one example, the object associated with the endpoint is a uniform resource locator, URL, requested to be accessed from the endpoint. For example, an end user at an endpoint may request access to a specific URL and the request is forwarded, by a security agent executing at the endpoint, to a frontend tier of the threat management application to determine whether the request should be allowed or denied. In a further example, the object is a file requested to be opened at the endpoint. In a yet further example, the object is processing logic, or is associated with or representative of such processing logic, requested to be processed or executed at the endpoint. The skilled person will appreciate that such examples are not limiting and the object may relate to any feature or functionality associated with the endpoint which may pose a security threat to the endpoint or any enterprise facility/network within which the endpoint exists.

At s608, the respective local compute resource determines if a local threat response to the threat lookup request is available within the first cache of the respective local compute resource. Step s608 is performed by the frontend tier of the threat management application. For example, in FIG. 5A the frontend tier 518 of the first local compute resource 516 (which has received a threat lookup request) determines if a local threat response to the threat lookup request is available within the first cache 520 of the first local compute resource 516. In other words, the frontend tier 518 of the local compute resource 516 analyzes the threat lookup request and checks the first cache 520 to determine whether a suitable threat response is available. For example, if the threat lookup request is associated with a URL requested to be accessed from the endpoint, then the frontend tier 518 will determine if a threat lookup request associated with the URL is present within the first cache 520 and, if so, will identify the corresponding threat response (e.g., deny access to the URL).

In one embodiment, the first cache of the respective local compute resource is a Level1 (L1) cache. As is known, an L1 cache provides fast memory storage by temporarily storing frequently accessed data to speed up the performance of retrieving data from memory. L1 cache serves the purpose of minimizing the time that the frontend tier (executing on a process or core of the respective local compute resource) has to wait for retrieving threat lookup requests and associated threat response pairs.

In general, a threat response identified within the first cache corresponds to a response which may be provided to the endpoint to mitigate or remediate any security threats posed by the object associated with the threat lookup request. In one example, when the object associated with the endpoint is a URL requested to be accessed from the endpoint, the threat response comprises an instruction to allow or deny the endpoint access to the URL. Alternatively, the instruction may allow the URL to be opened within a secure sandboxed environment available to the endpoint. In a further example, when the object associated with the endpoint is a file requested to be opened at the endpoint, the threat response comprises an instruction to allow or deny the file to be opened at the endpoint. Alternatively, the instruction may allow the file to be opened within a secure sandboxed environment available to the endpoint. In yet a further example, when the object associated with the endpoint is processing logic requested to be performed at the endpoint (or the object is associated with or indicative of such processing logic), the threat response comprises an instruction to allow or deny the processing logic to be performed or executed at the endpoint. Alternatively, the instruction may allow the processing logic to be performed or executed within a secure (e.g., isolated) virtual machine available to the endpoint.

If at s608, it is determined that a local threat response is available within the first cache, then the method 600 proceeds to s610. Otherwise, the method proceeds to s612.

At s610, the respective local compute resource is caused to provide the local threat response to the endpoint as a response to the threat lookup request. For example, the frontend tier of the threat management application may instruct the respective local compute resource to transmit the local threat response to the endpoint. As such, providing the endpoint the response to the threat lookup request helps mitigate or remediate any security threats posed by the object associated with the threat lookup request. Moreover, because the threat response is identified from a high-speed cache at a local compute resource (i.e., a compute resource which is proximate to, or has a low-latency connection with, the endpoint), the threat response is provided quickly and efficiently to the endpoint thereby decreasing the time a user has to wait for a threat response and thus increasing the usability and security of the endpoint.

At s612, the threat lookup request is forwarded from the respective local compute resource to the regional compute resource if it is determined at s608 that a local threat response is not available within the first cache. As described in more detail below in relation to FIG. 7, the backend tier of the threat management application deployed on the regional compute resource analyzes the threat lookup request to determine a threat response from a plurality of response units. As shown in FIG. 5A, the backend tier 512 deployed on the regional compute resource 510 uses the plurality of response units 514 to determine a remote threat response for the threat lookup request which may be subsequently provided to the endpoint as the response to the threat lookup request.

Optionally, at s614 the frontend tier of the threat management application receives, from the regional compute resource, a remote threat response based on the threat lookup request.

Optionally, at s616 the remote threat response is caused to be provided to the endpoint as the response to the threat look up request.

Optionally, at s618 the remote threat response is stored within the first cache of the respective local compute resource. The step s618 may be performed in parallel with, or after, step s616. In the example shown in FIG. 5A, the remote threat response is stored, along with the threat lookup request, in the first cache 520 of the first local compute resource 516 such the remote threat response can be provided to an endpoint in response to the threat lookup request being subsequently received at the first local compute resource 516. Storing the remote threat response and associated threat lookup request in the first cache helps to populate the first cache with common requests and emerging threats whilst decreasing the response time for subsequently received threat lookup requests.

In one embodiment, the method 600 includes one or both of the steps of deploying the backend tier of the threat management application on the regional compute resource and deploying the frontend tier of the threat management application on the one or more local compute resources (e.g., prior to the step s602). In one embodiment, the frontend tier is deployed on the one or more local compute resources according to the method 800 described in relation to FIG. 8 below.

Figure 7:
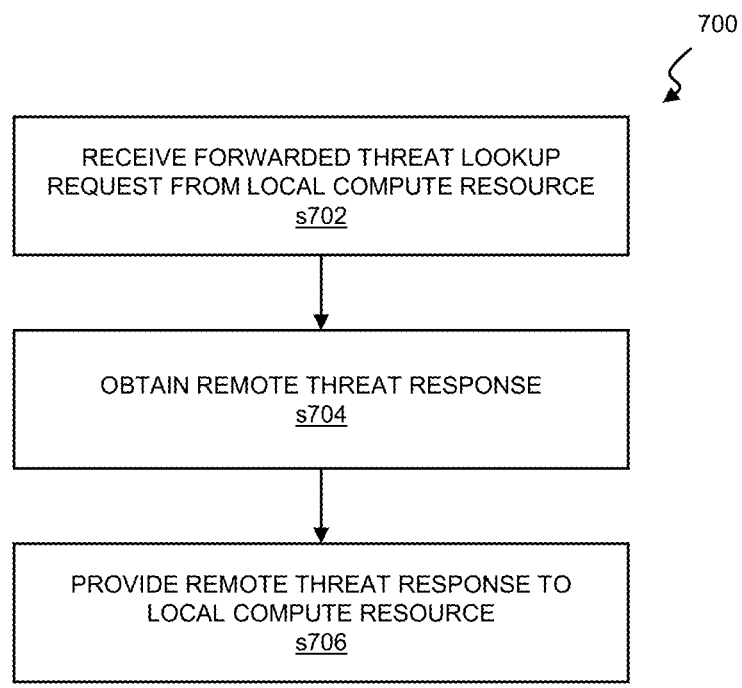
FIG. 7 illustrates a flow diagram of a method for determining a remote threat response at a backend tier of a threat management application.

FIG. 7 illustrates a flow diagram of a method 700 for determining a remote threat response at a backend tier of a threat management application according to embodiments of the present disclosure. As such, the method 700 corresponds to steps performed by a backend tier of a threat management application deployed on a regional compute resource in consequence of receiving a forwarded threat lookup request. That is, the method 700 corresponds to steps performed by the backend tier between step s612 and s614 of the method 600 shown in FIG. 6.

At s702, the backend tier of the threat management application deployed at the regional compute resource receives a forwarded threat lookup request from a local compute resource. More particularly, the threat lookup request is received from the frontend tier of the threat management application deployed on the local compute resource. In the example shown in FIG. 5A, the backend tier 512 deployed on the regional compute resource 510 receives a threat lookup request from the frontend tier deployed on a local compute resource (e.g., the frontend tier 518 deployed on the first local compute resource 516 within the first geographic zone 504). As discussed in relation to FIG. 6, the threat lookup request is forwarded to the backend tier because the frontend tier of the threat management application deployed on the local compute resource from which the threat lookup request has been forwarded could not find a local threat response within its first cache. Therefore, to determine an appropriate threat response, a larger pool of response units available to the backed tier are queried.

At s706, the backend tier of the threat management application obtains a remote threat response. As stated previously, the backend tier enjoys access to a wider range of approaches for determining a threat response to the threat lookup request than is available to local compute resources. That is, the backend tier of the threat management is not limited to a single cache to search for a threat response. Rather, the backend tier of the threat management application utilizes a plurality of response units to determine a threat response to a threat lookup request. For example, the backend tier 512 of the regional compute resource 510 utilizes one or more of the plurality of response units 514 to determine a threat response to a threat lookup request.

In general, a response unit corresponds to a data source, program, or predictive model which may determine a threat response from a threat lookup request. The first cache of a local compute resource thus constitutes an exemplary response unit. The plurality of response units accessible to the backend tier deployed at a regional compute resource (e.g., the plurality of response units 514 shown in FIG. 5A) comprises one or more of a second cache, one or more databases, and a prediction model.

The second cache of the plurality of response units is a temporary memory storage area which comprises pairs of threat lookup requests and corresponding threat responses. The second cache is one of a Level1 (L1) cache, a Level2 (L2) cache, or a Level3 (L3) cache. As such, the second cache may hold an additional and/or increased number of threat lookup requests and corresponding threat response pairs compared to the first cache of a local compute resource.

The one or more databases of the plurality of response units persistently store threat lookup requests and corresponding threat response pairs. The one or more databases may include one or more of: centralized databases, cloud databases, distributed databases, object-oriented databases, relational databases, and the like. The one or more databases provide access to more data than the first cache and/or the second cache but may take longer to query than the first cache and/or the second cache.

Each of the above described response units are populated with threat lookup requests and corresponding threat lookup responses by an external process or facility. For example, a service provider may populate each of the above described response units with requests and responses known to the service provider (e.g., as determined from historical activity and/or manually identified by security experts). In one embodiment, the second cache is populated with the most commonly occurring threat lookup requests and corresponding responses and the one or more databases are populated with all known threat lookup requests and corresponding response.

The plurality of response units further comprise a prediction model. The prediction model is used to predict a threat response to the threat lookup request (e.g., using rule-based logic, artificial intelligence, machine learning, or the like). In one embodiment, the prediction model is a machine learning model for predicting a threat response from a threat lookup request as is known in the art. By providing the prediction model, a threat response can always be provided for a threat lookup request even if the threat lookup request has not been previously encountered (e.g., if the threat lookup request is not included within the second cache or the one or more databases). Thus, the prediction model enables novel threats to be identified and responded to.

In one embodiment, the plurality of response units are prioritized in a hierarchical arrangement. As such, the backend tier of the threat management application may be configured to determine if the remote threat response is available within a respective response unit based on a priority assigned to the respective response unit. In other words, a first response unit may be given a higher priority over a second response unit, and the second response unit may be provided a higher priority over a third response unit, such that the backend tier will search for a threat response initially from the first response unit, then the second response unit, and then the third response unit. In other words, the backend tier of the threat management application may be configured to determine if the remote threat response is available within a first response unit having a first priority before a second response unit having a second priority, the first priority being greater than the second priority. In one embodiment, the second cache is assigned the highest priority, the one or more databases is assigned the second highest priority, and the prediction model is assigned the lowest priority such that the response units comprising known threat response data are searched before a predicted threat response is made.

At s706, the remote threat response is provided from the backend tier deployed on the regional compute resource to the frontend tier deployed on the local compute resource from which the threat lookup request was forwarded. For example, the remote threat response is sent from the backend tier 512 deployed on the regional compute resource 510 to the frontend tier 518 deployed on the first local compute resource 516 as a response to the threat lookup request forwarded from the first local compute resource 516 to the regional compute resource 510.

Figure 8:
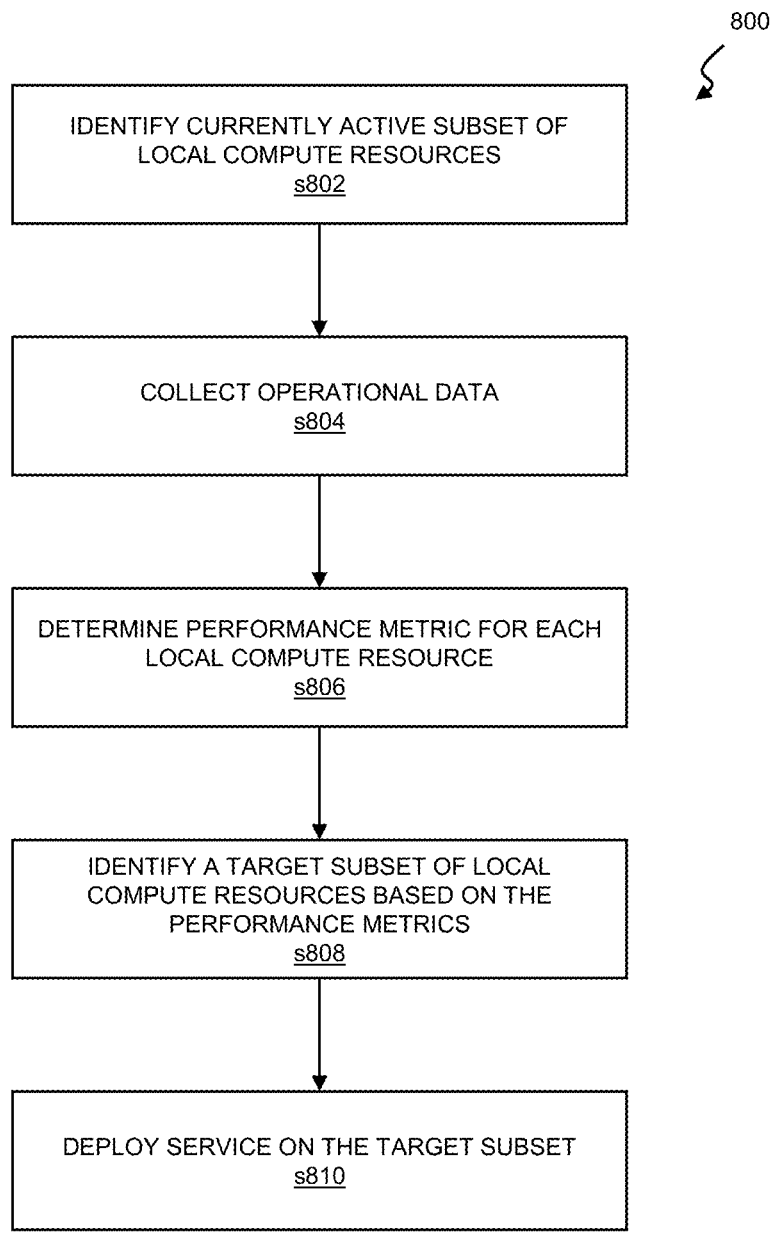
FIG. 8 illustrates a flow diagram of a method for optimizing deployment of services within a cloud environment comprising local compute resources.

FIG. 8 illustrates a flow diagram of a method 800 for optimizing deployment of services within a cloud environment comprising local compute resources (e.g., the cloud environment illustrated in FIG. 5A) according to an aspect of the present disclosure.

At s802, a currently active subset of local compute resources are identified within the cloud environment. Each of the currently active subset of local compute resources have a service deployed thereon. For example, FIG. 5B shows a currently active subset of local compute resources at a time point to which include the first local compute resource 528-1, the second local compute resource 528-2, and the fourth local compute resource 528-4. This subset of local compute resources are deemed to be "active" as they each have the frontend tier of the threat management application deployed thereon.

In s804, operational data related to the currently active subset of local compute resources 540 and one or more other local compute resources within the cloud environment is collected. The one or more other local compute resources relates to local compute resources that are located in the same geographic region as the currently active subset of local compute resources but are not currently serving endpoints for a specific service (e.g., the frontend tier of the threat management application). For example, in FIG. 5B the third local compute resource 528-3, the fifth local compute resource 528-5, and the sixth local compute resource 528-6 form the one or more other local compute resources as they do not form a part of the currently active subset (i.e., they do not have the frontend tier deployed thereon or they have not been provisioned to have the frontend tier deployed thereon).

In general, the operational data collected at s804 corresponds to data related to the performance, operation, and/or cost of a local compute resource. For each local compute resource, the operational data comprises at least one of telemetry data and/or latency data. Examples of telemetry data include network traffic data (e.g., bandwidth, packet count, packet loss, etc.), environmental data (e.g., device temperature, ambient temperature, local weather data, etc.), network device health data (e.g., router and switch status, port status, device performance, etc.), quality of service data, DNS and domain data, application performance data, and service/deployment cost data. Examples of latency data include round-trip time (RTT) data and jitter.

For example, the operational data may show that a currently active local compute resource (e.g., the fourth local compute resource 528-4 shown in FIG. 5B) is operating with very high latency and is thus potentially underperforming. Alternatively, the telemetry data may be showing that the local compute resource is experiencing unusual environmental conditions (e.g., high temperature) therefore may be underperforming. At the same time, one of the one or more local compute resources (e.g., the third local compute resource 528-3 shown in FIG. 5B) may be showing very low latency levels and/or good telemetry data.

At s806, a performance metric for each of the local compute resource is determined based upon the collected operational data. Generally, a performance metric is used to gauge how well a system or component is operating. Examples of performance metrics include computational cost, query volume measures, and energy usage measures. Computational cost relates to the cost of running a local compute resource which may factor in aspects such as power consumption, value, and deployment/maintenance costs. Query volume relates to the volume of queries that are handled by a local compute resource and may factor in aspects such as the total number of queries serviced during a time period and the average query response time. Energy use relates to the average energy usage of a local compute resource over a period of time (e.g., 1 hour, 8 hours, 24 hours, 1 week, etc.). The performance metric may combine one or more of the operation data described above into a single value or vector of values. Additionally, or alternatively, the performance metric may combine one or more of the above described metrics into a single value or vector of values. A local compute resource will have a high performance metric if it has a low latency, the telemetry data indicates it is operating in optimum environmental conditions, and/or it has a low computational cost.

The performance metric is determined from one or more current performance metrics. A current performance metric relates to a performance metric that can be calculated directly from the operational data. For example, computational cost, query volume, and energy usage that is calculated directly from the collected operational data. Additionally, or alternatively, the performance metric is determined from one or more predicted performance metrics. In one embodiment, the one or more predicted performance metrics are determined from trends identified within the operational data. For example, the operational data collected from a first local compute resource may identify that, during the time period of 06:00 to 08:00, the query volume for the first local compute resources increases such that a predicted performance metric associated with query volume may indicate that query volume is likely to increase during future 06:00-08:00 time periods. As such, a predicted performance metric corresponds to a prediction of a performance metric within a future time frame. For example, a query volume prediction for a local compute resource within a future time frame, or an energy usage prediction for a local compute resource within a future time frame. Thus, utilizing predicted performance metrics, deployment of the service within the cloud environment can be preemptively optimized ready for a predictable change in e.g., energy usage or query density. The predicted performance metrics may be determined or calculated using machine learning models. The machine learning models may analyze the collected operational data over time such that it can predict both trends in the data. For example, a machine learning model may learn from the operational data the above described trend relating to query volume increasing steeply at certain times of the day. The machine learning models can be used to identify trends in change to the traffic profile over time (e.g., time of day, day of week, and seasonal variations). Additionally, the machine learning models can be used to predict the change to traffic profile as the global Internet topology changes through measuring latency between different local compute resources. Decisively, the machine learning models are predictive such that new local compute resources may be brought online just before they are needed. In one embodiment, a regression algorithm (e.g., linear regression, support vector regression, gradient boosting, polynomial regression, etc.) is trained on historical data for each local compute resource to predict a value for a performance metric for each local compute resource at a future time point based on one or more current performance metric values for each local compute resource and/or one or more other data values (e.g., current traffic volume, current date and time, other state based data, etc.).

At s808, a target subset of local compute resources are identified based on the performance metric such that the performance metric associated with each of the target subset of local compute resources (e.g., computational cost, query volume, energy usage, load from customer base, latency to next closes local compute resource, number of local compute resources connected to regional compute resource, etc.) satisfies a predetermined criterion. For example, in the example shown in FIG. 5B, the first subset 530 of local compute resources correspond to the target subset because the performance metric for each of the local compute resources within the first subset 530 satisfy a criterion (i.e., the performance metrics exceed the threshold r). The predetermined criterion may be a predetermined threshold value or a relative threshold value (e.g., performance metrics satisfy the predetermined criterion if they are within the top 5%, 10%, 25%, etc. of performance metrics measured across all local compute resources).

At s810, the deployment of the service is adjusted such that the service is deployed on each of the target subset of local compute resources. In the example shown in FIG. 5B, the service is deployed on the local compute resources within the first subset 530 (as shown by the second state 526-2 of the plurality of local compute resources at time $t_{n+1}$). As such, the service is deployed on the first subset 530 of local compute resources but not on the second subset 532 of local compute resources. That is, the service is spun up on the third local compute resource 528-3 and spun down on the fourth local compute resource 528-4. In consequence, the service is subsequently only deployed on the target subset of local compute resources (i.e., the first subset 530 of local compute resources shown in FIG. 5B).

As such, adjusting deployment of the service comprises provisioning the service at one or more local compute resources which are within the target subset of local compute resources but not within the currently active subset of local compute resources (e.g., provisioning the frontend tier on the third local compute resource 528-3 shown in FIG. 5B). In one embodiment, the service is provisioned at the one or more local compute resources based on a configuration inherited from a regional compute resource. Additionally, or alternatively, adjusting deployment of the service comprises deprovisioning the service at one or more local compute resources which are within the currently active subset of local compute resources but not within the target subset of local compute resources (e.g., deprovisioning the frontend tier on the fourth local compute resource 528-4 shown in FIG. 5B).

In adjusting the deployment of the service to the target subset, the deployment of the service is adjusted so as to be deployed on the highest performing local compute resources. Since the target subset is based upon the local compute resources with the highest associated performance metrics, the local compute resources with the best performance metrics (e.g., best latency, telemetry data, etc.) are used to service the endpoints within the cloud environment. This helps ensure that the endpoints are provided with a faster speed of threat response, improved endpoint security, and more robustness to changes in environment.

Steps s802-s808 of the method 800 shown in FIG. 8 analyze the cloud environment, whilst step s810 adjusts deployment of the service within the cloud environment based on the analysis. In one embodiment, the method 800 further comprises repeating analyzing of the cloud environment and adjusting deployment of the service thereby iteratively optimizing deployment of the service. For example, the method 800 may be repeatedly performed every 1 minute, 10 minutes, 60 minutes, 2 hours, etc. so as to iteratively discover the optimal service deployment configuration. This is beneficial as it means that service deployment is agile to changes in environment, network topology, performance, etc. By repeatedly optimizing the deployment of the service within the cloud environment, the service is made more robust to changes in environment and performance drops of systems or components within the cloud environment. As such, a consistently high level of performance can be provided for the security service(s) deployed at the endpoints irrespective of the environmental conditions or changes in the cloud environment.

In one embodiment, the methods shown in FIGS. 6-8 are performed in conjunction. That is, the method 800 shown in FIG. 8 is used to deploy a frontend tier of a threat management application on one or more local compute resources. The methods 600 and 700 of FIGS. 6 and 7 respectively are then used to provide a decoupled threat management application using the one or more local compute resources deployed using the method 800 of FIG. 8. The combined methods provide a self-optimizing and decoupled threat management application within a cloud environment which can adapt to changes in the performance and/or topology of the cloud environment whilst providing efficient and low latency threat responses to threat lookup requests.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

NUMBERED STATEMENTS

1. A system for deployment of decoupled threat management applications, wherein the system is configured to:
   deploy, at a regional compute resource of a cloud environment, a backend tier of a threat management application, wherein the regional compute resource is located within a geographic region having one or more geographic zones; and
   deploy, at one or more local compute resources of the cloud environment, a frontend tier of the threat management application, wherein the one or more local compute resources are located within the one or more geographic zones of the geographic region, each of the one or more local compute resources comprising a respective first cache;
   wherein the frontend tier of the threat management application, when executed by a respective local compute resource, causes the respective local compute resource to:
   receive, from an endpoint, a threat lookup request in relation to an object associated with the endpoint, wherein the threat lookup request is routed from the endpoint to the respective local compute resource based at least in part on a latency between the endpoint and the respective local compute resource;
   determine if a local threat response to the threat lookup request is available within the first cache of the respective local compute resource;
   if the local threat response is available within the first cache, cause the local threat response to be provided to the endpoint as a response to the threat lookup request; and
   if the local threat response is not available within the first cache, forward the threat lookup request to the regional compute resource.
2. The system of statement 1 wherein the frontend tier of the threat management application, when executed by the respective local compute resource, further causes the local compute resource to:
   receive, from the regional compute resource, a remote threat response based on the threat lookup request; and
   cause the remote threat response to be provided to the endpoint as the response to the threat lookup request.
3. The system of statement 2 wherein the frontend tier of the threat management application, when executed by the respective local compute resource, further causes the local compute resource to:
store the remote threat response within the first cache of the respective local compute resource.
4. The system of statement 2 wherein the backend tier of the threat management application is configured to obtain the remote threat response from one of a plurality of response units accessible to the regional compute resource.
5. The system of statement 4 wherein the plurality of response units accessible to the regional compute resource comprise a second cache, one or more databases, and a prediction model.
6. The system of statement 5 wherein the plurality of response units are prioritized such that the backend tier of the threat management application is configured to determine if the remote threat response is available within a respective response unit based on a priority assigned to the respective response unit.
7. The system of statement 6 wherein the backend tier of the threat management application is configured to determine if the remote threat response is available within a first response unit having a first priority before a second response unit having a second priority, the first priority being greater than the second priority.
8. The system of statement 6 wherein the second cache has a greater priority than the one or more databases and the prediction model.
9. The system of statement 1 wherein the object associated with the endpoint is a uniform resource locator, URL, requested to be accessed from the endpoint.
10. The system of statement 9 wherein the response provided to the endpoint comprises an instruction to allow or deny the endpoint to access the URL.
11. The system of statement 1 wherein the object associated with the endpoint is a file requested to be opened at the endpoint.
12. The system of statement 11 wherein the response provided to the endpoint comprises an instruction to allow or deny the file to be opened at the endpoint.
13. The system of statement 1 wherein the object associated with the endpoint is processing logic requested to be performed at the endpoint.
14. The system of statement 13 wherein the response provided to the endpoint an instruction to allow or deny the processing logic to be performed at the endpoint.
15. A method for deployment of decoupled threat management applications, the method comprising:
identifying a regional compute resource of a cloud environment, the regional compute resource having a backend tier of a threat management application deployed thereon, wherein the regional compute resource is located within a geographic region;
identifying one or more local compute resources of the cloud environment each having a frontend tier of the threat management application deployed thereon, wherein the one or more local compute resources are located within one or more geographic zones of the geographic region, each of the one or more local compute resources comprising a first cache;
receiving, at a respective local compute resource and from an endpoint, a threat lookup request in relation to an object associated with the endpoint, wherein the threat lookup request is routed from the endpoint to the respective local compute resource based on a latency between the endpoint and the respective local compute resource;
determining, at the respective local compute resource, if a local threat response to the threat lookup request is available within the first cache of the respective local compute resource;
if the local threat response is available within the first cache, causing, at the respective local compute resource, the local threat response to be provided to the endpoint as a response to the threat lookup request; and
if the local threat response is not available within the first cache, forwarding, from the respective local compute resource, the threat lookup request to the regional compute resource.
16. The method of statement 15 further comprising:
receiving, from the regional compute resource, a remote threat response based on the threat lookup request; and
causing the remote threat response to be provided to the endpoint as the response to the threat lookup request.
17. The method of statement 16 further comprising:
storing the remote threat response within the first cache of the respective local compute resource.
18. The method of statement 16 further comprising:
deploying, at the regional compute resource of the cloud environment, the backend tier of the threat management application.
19. The method of statement 16 further comprising:
deploying, at the one or more local compute resources of the cloud environment, the frontend tier of the threat management application.
20. A non-transitory computer readable medium storing instructions which, when executed by one or more processors of a device, cause the device to carry out the steps of:
identifying a regional compute resource of a cloud environment, the regional compute resource having a backend tier of a threat management application, wherein the regional compute resource is located within a geographic region;
identifying one or more local compute resources of the cloud environment each having a frontend tier of the threat management application deployed thereon, wherein the one or more local compute resources are located within one or more geographic zones of the geographic region, each of the one or more local compute resources comprising a first cache;
receiving, at a respective local compute resource and from an endpoint, a threat lookup request in relation to an object associated with the endpoint, wherein the threat lookup request is routed from the endpoint to the respective local compute resource based on a latency between the endpoint and the respective local compute resource;
determining, at the respective local compute resource, if a local threat response to the threat lookup request is available within the first cache of the respective local compute resource;
if the local threat response is available within the first cache, causing, at the respective local compute resource, the local threat response to be provided to the endpoint as a response to the threat lookup request; and
if the local threat response is not available within the first cache, forwarding, from the respective local compute resource, the threat lookup request to the regional compute resource.

21. A method for optimizing deployment of services within a cloud environment comprising local compute resources, the method comprising:
analyzing the cloud environment by:
identifying a currently active subset of local compute resources within the cloud environment, each of the currently active subset of local compute resources having a service deployed thereon;
collecting operational data related to the currently active subset of local compute resources and one or more other local compute resources within the cloud environment;
determining a performance metric for each local compute resource based on the operational data; and
identifying a target subset of local compute resources based on the performance metric, wherein the performance metric associated with each of the target subset of local compute resources satisfies a predetermined criterion; and
adjusting deployment of the service such that the service is deployed on each of the target subset of local compute resources.

22. The method of statement 21 further comprising repeating analyzing of the cloud environment and adjusting deployment of the service thereby iteratively optimizing deployment of the service.

23. The method of statement 21 wherein identifying the currently active subset of local compute resources comprises deploying the service on the currently active subset of local compute resources.

24. The method of statement 21 wherein the operational data comprises at least one of telemetry data or latency data for each of the local compute resources.

25. The method of statement 21 wherein the performance metric for each local compute resource is a computational cost.

26. The method of statement 21 wherein the predetermined criterion comprises a threshold performance metric such that the performance metric associated with each of the target subset of local compute resources exceeds the threshold.

27. The method of statement 26 wherein the step of adjusting deployment of the service comprises provisioning the service at one or more local compute resources which are within the target subset of local compute resources but not within the currently active subset of local compute resources.

28. The method of statement 27 wherein the service is provisioned at the one or more compute resources based on a configuration inherited from a regional compute resource.

29. The method of statement 26 wherein the step of adjusting deployment of the service comprises deprovisioning the service at one or more local compute resources which are within the currently active subset of local compute resources but not within the target subset of local compute resources.

30. The method of statement 21 wherein the step of determining the performance metric comprises determining one or more predicted performance metrics for one or more local compute resources.

31. The method of statement 30 wherein the one or more predicted performance metrics for the one or more compute resources are determined from trends identified within the operational data related to the one or more compute resources.

32. The method of statement 30 wherein the one or more predicted performance metrics comprise query volume predictions for the one or more local compute resources within a future time frame.

33. The method of statement 30 wherein the one or more predicted performance metrics comprise energy usage predictions for the one or more local compute resources within a future time frame.

34. The method of statement 21 wherein the step of determining the performance metric comprises determining one or more current performance metrics for one or more local compute resources.

35. The method of statement 34 wherein the one or more current performance metrics comprise current query volume measures for the one or more local compute resources.

36. The method of statement 34 wherein the one or more current performance metrics comprise current energy usage measures for the one or more local compute resources.

37. The method of statement 21 wherein the service is a frontend tier of a threat management application.

38. A non-transitory computer readable medium storing instructions which, when executed by one or more processors of a device, cause the device to carry out the steps of:
identifying a current subset of local compute resources within a cloud environment, each of the current subset of local compute resources having a service deployed thereon;
collecting operational data related to the current subset of local compute resources and one or more other local compute resources within the cloud environment;
determining a performance metric for each local compute resource based on the operational data;
identifying a target subset of local compute resources based on the performance metric, wherein the performance metric associated with each of the target subset of local compute resources satisfies a predetermined criterion; and
adjusting deployment of the service such that the service is subsequently only deployed on the target subset of local compute resources.

39. A device comprising one or more processors and a memory storing instructions which, when executed by the one or more processors, cause the device to carry out the steps of:
identifying a first subset of local compute resources within the cloud environment, each of the first subset of local compute resources having a service deployed thereon;
collecting operational data related to the first subset of local compute resources and one or more other local compute resources within the cloud environment;
determining a performance metric for each local compute resource based on the operational data;
identifying a second subset of local compute resources based on the performance metric, wherein the performance metric associated with each of the second subset of local compute resources satisfies a predetermined criterion; and
adjusting deployment of the service such that the service is deployed on the second subset of local compute resources and not on the first subset of local compute resources.

40. A system for deployment of decoupled threat management applications within a cloud environment comprising local compute resources, the system comprising:
- an interface communicatively coupled to:
  - a regional compute resource of a cloud environment, the regional compute resource comprising a back-end tier of a threat management application, wherein the regional compute resource is located within a geographic region having a plurality of geographic zone; and
  - a plurality of local compute resources of the cloud environment, each of the plurality of local compute resources comprising a frontend tier of the threat management application and a respective first cache, wherein the plurality of local compute resources are located within the plurality of geographic zones of the geographic region; and
- one or more processors configured to:
  - identify a first subset of the plurality of local compute resources within the cloud environment;
  - collect operational data related to the plurality of local compute resources within the cloud environment;
  - determine a performance metric for each of the plurality of local compute resources based on the operational data;
  - identify a second subset of the plurality of local compute resources based on the performance metric, wherein the performance metric associated with each of the second subset of the plurality of local compute resources satisfies a predetermined criterion; and
  - adjust deployment of the frontend tier of the threat management application such that the frontend tier of the threat management application is deployed on each of the second subset of the plurality of local compute resources;
- wherein the frontend tier of the threat management application, when executed by a respective local compute resource of the plurality of local compute resources, causes the respective local compute resource to:
  - receive, from an endpoint, a threat lookup request in relation to an object associated with the endpoint, wherein the threat lookup request is routed from the endpoint to the respective local compute resource based at least in part on a latency between the endpoint and the respective local compute resource;
  - determine if a local threat response to the threat lookup request is available within the first cache of the respective local compute resource;
  - if the local threat response is available within the first cache, cause the local threat response to be provided to the endpoint as a response to the threat lookup request; and
  - if the local threat response is not available within the first cache, forward the threat lookup request to the regional compute resource.

What is claimed is:

1. A method for optimizing deployment of services within a cloud environment comprising local compute resources, the method comprising:
analyzing the cloud environment by:
identifying a currently active subset of local compute resources within the cloud environment, each of the currently active subset of local compute resources having a service deployed thereon;
collecting operational data related to the currently active subset of local compute resources and one or more other local compute resources within the cloud environment;
determining a performance metric for each local compute resource based on the operational data; and
identifying a target subset of local compute resources based on the performance metric, wherein the performance metric associated with each of the target subset of local compute resources satisfies a predetermined criterion; and
adjusting deployment of the service such that the service is deployed on each of the target subset of local compute resources.

2. The method of claim 1, further comprising repeating analyzing of the cloud environment and adjusting deployment of the service thereby iteratively optimizing deployment of the service.

3. The method of claim 1, wherein identifying the currently active subset of local compute resources comprises deploying the service on the currently active subset of local compute resources.

4. The method of claim 1, wherein the operational data comprises at least one of telemetry data or latency data for each of the local compute resources.

5. The method of claim 1, wherein the performance metric for each local compute resource is a computational cost.

6. The method of claim 1, wherein the predetermined criterion comprises a threshold performance metric such that the performance metric associated with each of the target subset of local compute resources exceeds the threshold.

7. The method of claim 6, wherein the step of adjusting deployment of the service comprises provisioning the service at one or more local compute resources which are within the target subset of local compute resources but not within the currently active subset of local compute resources.

8. The method of claim 7, wherein the service is provisioned at the one or more compute resources based on a configuration inherited from a regional compute resource.

9. The method of claim 6, wherein the step of adjusting deployment of the service comprises deprovisioning the service at one or more local compute resources which are within the currently active subset of local compute resources but not within the target subset of local compute resources.

10. The method of claim 1, wherein the step of determining the performance metric comprises determining one or more predicted performance metrics for one or more local compute resources.

11. The method of claim 10, wherein the one or more predicted performance metrics for the one or more compute resources are determined from trends identified within the operational data related to the one or more compute resources.

12. The method of claim 10, wherein the one or more predicted performance metrics comprise query volume predictions for the one or more local compute resources within a future time frame.

13. The method of claim 10, wherein the one or more predicted performance metrics comprise energy usage predictions for the one or more local compute resources within a future time frame.

14. The method of claim 1, wherein the step of determining the performance metric comprises determining one or more current performance metrics for one or more local compute resources.

15. The method of claim 14, wherein the one or more current performance metrics comprise current query volume measures for the one or more local compute resources.

16. The method of claim 14, wherein the one or more current performance metrics comprise current energy usage measures for the one or more local compute resources.

17. The method of claim 1, wherein the service is a frontend tier of a threat management application.

18. A non-transitory computer readable medium storing instructions which, when executed by one or more processors of a device, cause the device to carry out the steps of:
  identifying a current subset of local compute resources within a cloud environment, each of the current subset of local compute resources having a service deployed thereon;
  collecting operational data related to the current subset of local compute resources and one or more other local compute resources within the cloud environment;
  determining a performance metric for each local compute resource based on the operational data;
  identifying a target subset of local compute resources based on the performance metric, wherein the performance metric associated with each of the target subset of local compute resources satisfies a predetermined criterion; and
  adjusting deployment of the service such that the service is subsequently only deployed on the target subset of local compute resources.

19. A device comprising one or more processors and a memory storing instructions which, when executed by the one or more processors, cause the device to carry out the steps of:
  identifying a first subset of local compute resources within a cloud environment, each of the first subset of local compute resources having a service deployed thereon;
  collecting operational data related to the first subset of local compute resources and one or more other local compute resources within the cloud environment;
  determining a performance metric for each local compute resource based on the operational data;
  identifying a second subset of local compute resources based on the performance metric, wherein the performance metric associated with each of the second subset of local compute resources satisfies a predetermined criterion; and
  adjusting deployment of the service such that the service is deployed on the second subset of local compute resources and not on the first subset of local compute resources.

20. A system for deployment of decoupled threat management applications within a cloud environment comprising local compute resources, the system comprising:
  an interface communicatively coupled to:
    a regional compute resource of a cloud environment, the regional compute resource comprising a backend tier of a threat management application, wherein the regional compute resource is located within a geographic region having a plurality of geographic zones; and
    a plurality of local compute resources of the cloud environment, each of the plurality of local compute resources comprising a frontend tier of the threat management application and a respective first cache, wherein the plurality of local compute resources are located within the plurality of geographic zones of the geographic region; and
  one or more hardware processors configured to:
    identify a first subset of the plurality of local compute resources within the cloud environment;
    collect operational data related to the plurality of local compute resources within the cloud environment;
    determine a performance metric for each of the plurality of local compute resources based on the operational data;
    identify a second subset of the plurality of local compute resources based on the performance metric, wherein the performance metric associated with each of the second subset of the plurality of local compute resources satisfies a predetermined criterion; and
    adjust deployment of the frontend tier of the threat management application such that the frontend tier of the threat management application is deployed on each of the second subset of the plurality of local compute resources;
  wherein the frontend tier of the threat management application, when executed by a respective local compute resource of the plurality of local compute resources, causes the respective local compute resource to:
    receive, from an endpoint, a threat lookup request in relation to an object associated with the endpoint, wherein the threat lookup request is routed from the endpoint to the respective local compute resource based at least in part on a latency between the endpoint and the respective local compute resource;
    determine if a local threat response to the threat lookup request is available within the first cache of the respective local compute resource;
    if the local threat response is available within the first cache, cause the local threat response to be provided to the endpoint as a response to the threat lookup request; and
    if the local threat response is not available within the first cache, forward the threat lookup request to the regional compute resource.

* * * * *